May 11, 1926.
W. E. BEE
COUPLING
Filed April 14, 1924
1,584,424
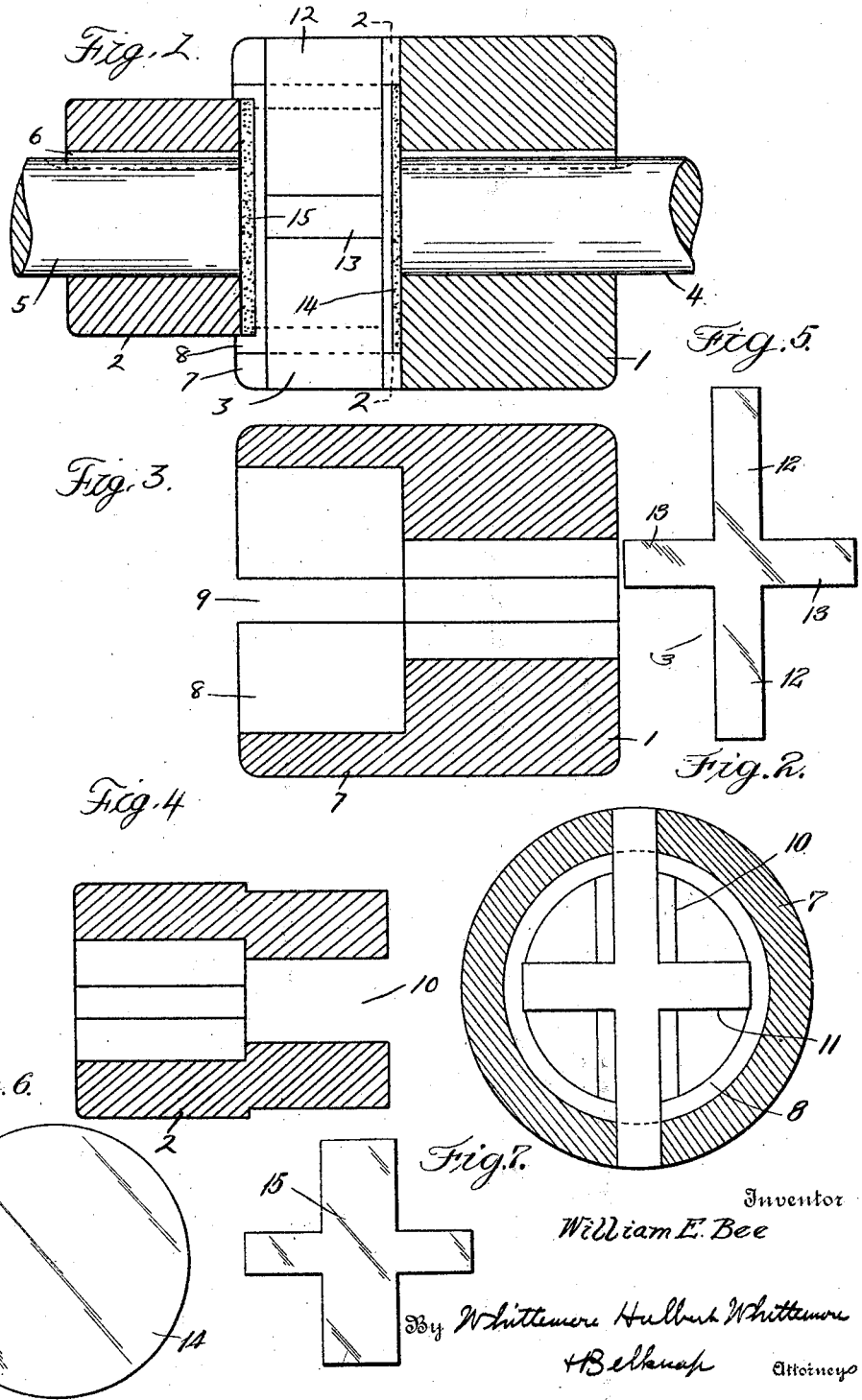

Patented May 11, 1926.

1,584,424

UNITED STATES PATENT OFFICE.

WILLIAM E. BEE, OF DETROIT, MICHIGAN, ASSIGNOR TO PALMER-BEE COMPANY, OF DETROIT, MICHIGAN, A CORPORATION OF MICHIGAN.

COUPLING.

Application filed April 14, 1924. Serial No. 706,553.

The invention relates to couplings and has for one of its objects the provision of a coupling between driving and driven members which permits these members to be out of axial alignment. Another object of the invention is the provision of a coupling in which the stress between the driving and intermediate members of the coupling and the stress between the intermediate and driven members of the coupling are in the same plane. With these as well as other objects in view, the invention resides in the novel features of construction and combinations and arrangements of parts as more fully hereinafter set forth.

In the drawings:

Figure 1 is a longitudinal sectional elevation of a coupling embodying my invention;

Figure 2 is a cross section on the line 2—2 of Figure 1;

Figures 3 and 4 are longitudinal sections at right angles to Figure 1 of the driving and driven coupling members respectively;

Figure 5 is an end view of the intermediate coupling member;

Figures 6 and 7 are end views of members intermediate the driving and intermediate coupling members and the intermediate and driven coupling members, respectively.

1 is the driving coupling member, 2 the driven coupling member, and 3 the intermediate coupling member, the driving and driven coupling members being suitably secured upon adjacent ends of the driving and driven shafts 4 and 5 respectively by suitable means such as the keys 6.

The driving coupling member has at its inner ends the cylindrical flange 7 surrounding the co-axial recess 8 and provided with the diametrically-opposite recesses 9 which are preferably open-ended slots. The driven coupling member 2 has its inner end of a diameter such that it will engage in the co-axial recess 8 of the driving coupling member and provide an appreciable clearance between its surface and the inner surface of the cylindrical flange 7. The inner end of the driven coupling member is provided with the diametrically-extending recesses 10 and 11 which are preferably in the form of open-ended slots. These recesses extend at right angles to each other. The intermediate coupling member 3 is in the form of a cross and has the set of aligned arms 12 and the set of aligned arms 13, the latter extending at right angles to the former. These arms are all in the same plane and the arms 12 engage in the recesses 10 of the driven coupling member and the recesses 9 of the driving coupling member, while the arms 13 engage in the recesses 11 of the driven coupling member.

To permit the driving and driven coupling members to be out of axial alignment, the recesses 10 have a width greater than the thickness of the arms 12 to provide clearance for movement of the driven coupling member at right angles to the arms 12 of the intermediate coupling member which engages these recesses. This clearance is preferably approximately equal to the clearance between the surface of the driven coupling member and the inner surface of the cylindrical flange upon the driving coupling member. With this arrangement the intermediate coupling member may slide in the driven coupling member transversely of the recesses 10, and furthermore, the intermediate coupling member may slide in the driving coupling member in alignment with the recesses 10, whereby the coupling is adapted to function regardless of the relative positions of the axes of the driving and driven coupling members.

14 is a fibrous member preferably having a circular shape, this member being located at the inner end of the co-axial recess 8 of the driving coupling member and at one side of the intermediate coupling member. 15 is a second fibrous member preferably in the form of a cross having arms adapted to fit in the recesses 10 and 11 of the driven coupling member, this second coupling member being at the side of the intermediate coupling member opposite the fibrous member 14. By reason of these members, the edges of the arms of the intermediate coupling member are held from coming into contact with the driving and driven coupling members and the coupling is made more quiet in operation.

What I claim as my invention is:

1. In a coupling, the combination with driving and driven members, one of said members having a portion provided with a substantially co-axial recess and diametrically-opposite recesses opening thereinto and the other of said members having a portion freely engaging in said co-axial recess and provided with diametrically-extending recesses at right angles to each other, one of said recesses being in alignment with said diametrically-opposite recesses in said first-mentioned member and having a greater width, and an intermediate cross-shaped member having pairs of aligned arms all arranged in the same plane, one pair of arms engaging in said diametrically-opposite recesses of the first mentioned member and also in said recesses of greater width of the second mentioned member, and the other pair of arms engaging in the other of said recesses of the second mentioned member.

2. In a coupling, the combination with driving and driven members, one of said members having a cylindrical flange provided with diametrically-opposite slots extending longitudinally thereof and the other of said members having a portion engageable within said cylindrical flange provided with diametrically-extending slots at right angles to each other, one of said slots having a greater width than said slots in the first mentioned member and being in alignment therewith, and an intermediate cross-shaped member having pairs of aligned arms extending at right angles to each other, one pair of arms slidably engaging in said diametrically-opposite slots in the first mentioned member and also engaging in the slots of greater width in said second mentioned member, and the other pair of arms slidably engaging in the other slots in the second mentioned member.

3. In a coupling, the combination with driving and driven members, one of said members having a cylindrical flange provided with diametrically-opposite slots extending longitudinally thereof and the other of said members having a portion engageable within said cylindrical flange provided with diametrically-extending slots at right angles to each other, one of said slots having a greater width than said slots in the first mentioned member and being in alignment therewith, and an intermediate cross-shaped member having pairs of aligned arms extending at right angles to each other, one pair of arms slidably engaging in said diametrically-opposite slots in the first mentioned member, and also engaging in the slots of greater width in said second mentioned member, the other pair of arms slidably engaging in the other slots in the second mentioned member, and yieldable means between said first mentioned and intermediate members and intermediate and second mentioned members for retaining the edges of the arms of said intermediate member from contact with said driving and driven members.

In testimony whereof I affix my signature.

WILLIAM E. BEE.